US011796461B2

(12) United States Patent
Olenberg et al.

(10) Patent No.: US 11,796,461 B2
(45) Date of Patent: Oct. 24, 2023

(54) METHOD AND APPARATUS FOR ANALYZING PLASTIC PREFORMS

(71) Applicant: KRONES AG, Neutraubling (DE)

(72) Inventors: Philipp Olenberg, Regensburg (DE); Simon Fischer, Regensburg (DE); Robert Aust, Illkofen (DE); Jochen Forsthoevel, Regensburg (DE)

(73) Assignee: KRONES AG

(*) Notice: Subject to any disclaimer, the term of this patent is extended or adjusted under 35 U.S.C. 154(b) by 2 days.

(21) Appl. No.: 17/566,310

(22) Filed: Dec. 30, 2021

(65) Prior Publication Data

US 2022/0307979 A1 Sep. 29, 2022

(30) Foreign Application Priority Data

Mar. 25, 2021 (DE) .................. 10 2021 107 545.9

(51) Int. Cl.
*G01N 21/35* (2014.01)
*G01N 21/3563* (2014.01)
*B29C 49/80* (2006.01)

(52) U.S. Cl.
CPC ......... *G01N 21/3563* (2013.01); *B29C 49/80* (2013.01)

(58) Field of Classification Search
CPC ..................... G01N 21/3563; B29C 49/80
See application file for complete search history.

(56) References Cited

U.S. PATENT DOCUMENTS

| 2003/0159856 | A1* | 8/2003 | Cochran ............. G01G 15/00 177/25.11 |
| 2003/0223086 | A1* | 12/2003 | Semersky ............ B29C 49/78 356/630 |
| 2007/0096352 | A1* | 5/2007 | Cochran ............. H05B 3/0057 264/492 |
| 2009/0261513 | A1 | 10/2009 | Forsthovel et al. ........ 264/410 |

FOREIGN PATENT DOCUMENTS

| DE | 10 2017 101 000 | 7/2017 | ........... G01N 21/359 |
| EP | 2 110 224 | 10/2009 | ............ B29C 49/54 |
| EP | 2 790 005 | 10/2014 | ............ G01N 21/35 |
| EP | 3 421 973 | 1/2019 | ......... G01N 21/3554 |
| JP | S58-214839 | 12/1983 | ............. G01N 21/33 |

OTHER PUBLICATIONS

Extended European Search Report issued in EP Patent Appln. Serial No. 21 20 9726, dated May 16, 2022, with machine English translation, 9 pages.

* cited by examiner

*Primary Examiner* — Hugh Maupin
(74) *Attorney, Agent, or Firm* — HAYES SOLOWAY P.C.

(57) ABSTRACT

Disclosed is a method analysing plastic preforms, wherein plastic preforms are transported along a predetermined transport path by a transport device and an infrared absorption coefficient is determined in at least one region of the plastic preform, wherein, in order to determine the infrared absorption coefficient of the plastic preform, infrared radiation is applied to the plastic preform by a first radiation device and radiation passing through the plastic preform is received by at least one receiving device and an infrared absorption behaviour of the plastic preform is determined from this received radiation, wherein the radiation device acts upon the plastic preforms with infrared radiation in a predetermined wavelength range and an evaluation device (Continued)

evaluates the radiation as a function of its wavelength in a wavelength range from 1500 nm to 2000 nm.

20 Claims, 3 Drawing Sheets

METHOD AND APPARATUS FOR ANALYZING PLASTIC PREFORMS

BACKGROUND OF THE INVENTION

The present invention relates to a method and apparatus for analyzing plastic preforms. In the prior art, it is known that plastic preforms are heated and subsequently formed into bottles by forming devices such as stretch blow molding machines. More recently, plastic preforms made partly or entirely of recycled material have also been used for this purpose. However, it is found that the material of such plastic preforms is less homogeneous with respect to its plastic material properties than when non-recycled material is used. Therefore, in the prior art, the production of rejects often occurs due to these inhomogeneities.

Accordingly, devices and methods are known from the prior art in which the plastic preforms are analyzed, in particular in order to be able to specifically act on the production of the plastic preforms and/or on parameters during heating or forming of the plastic preforms.

From EP 2 110 224 A1 a method and an apparatus for producing plastic containers with infrared absorption monitoring are known. It is known that the infrared absorption coefficient is determined in at least one region of the plastics and that a value characteristic of this infrared absorption coefficient is subsequently used in the production of the plastic preforms. Thereby, it is described that it is possible to detect quality parameters of plastic preforms in the near infrared range. In addition, it is also known from the publication that these parameters can be used to control plants.

In addition, it is also known from the applicant's internal prior art that the detectable quality parameters include the broadband infrared absorption of the plastic preforms, which influences the heating of the plastic preforms and the machine settings used for this purpose. In itself undesirable batch variations, which can occur in the plastic preforms in particular also when recycled material is used, can cause changing infrared absorptions.

In addition, the applicant has found that a quality parameter that can be detected is also the water content of the plastic preforms, which on the one hand is a general quality parameter related to the storage time and treatment of the plastic preforms, but furthermore can also influence the subsequent properties of the containers made from the plastic preforms. It can also influence the behaviour of the plastic preforms in the heating process and in particular with infrared or microwave radiation.

In the case of the above-mentioned EP 2 110 224 B1, in particular, the control of the addition of infrared absorption material in the production of plastic preforms was disclosed on the basis of a degree of infrared absorption determined thereon. In this connection, wave ranges from, for example, 800 nm to 1200 nm, from 1200 nm to 1500 nm or also from 3000 nm to 7000 nm are claimed for determining the infrared quality parameters.

However, the applicant has determined that in the ranges of, for example, 800 to 1500 nm, the reflection is dominant and thus the measurement of the absorption is unfavourable. In addition, the sensitivity of suitable detectors is also unfavourable and furthermore also the detection of the water absorption band is less useful (in this range there is only a rather weak absorption band around approx. 1420 nm).

In the described longer wavelength ranges, which include for example 3000 to 7000 nanometers, on the one hand the absorption of the material is very strong and makes the measurement (of the transmission) through the relatively thick-walled plastic preforms difficult. Furthermore, a strong water absorption band in the wave range between 1500 nm and 3000 nm is comparatively easy to access for measurement.

The skilled person is therefore faced with the object of better adapting such absorption measurements to the production of plastic containers.

SUMMARY OF THE INVENTION

In a method according to the invention for analyzing plastic preforms (and/or for determining physical and, in particular, optical properties of plastic preforms), plastic preforms are transported along a transport path by means of a transport device, and an infrared absorption coefficient of the plastic preforms is determined in at least one region of the plastic preform, wherein, in order to determine the infrared absorption coefficient, the plastic preform is acted upon with infrared radiation by means of a first radiation device, and radiation passing to through the plastic preform is recorded by means of at least one receiving device. From this received radiation, an infrared absorption behaviour of the plastic preform (in particular as a function of a wavelength of the radiation) is determined.

According to the invention, the radiation device applies infrared radiation in a predetermined wavelength range to the plastic preforms and an evaluation device evaluates the radiation as a function of its wavelength in a wavelength range from 1500 nanometers to 2000 nanometers.

In particular, the evaluation device determines an intensity of the radiation passing through the plastic preforms as a function of a wavelength of the radiation.

In a preferred embodiment, the plastic preforms are transported along a rectilinear transport path during the determination of the absorption behavior. In a further preferred method, the plastic preforms are transported at a distance from each other during the determination of the absorption behaviour.

Advantageously, the plastic preforms are conveyed between the radiation device and the receiving device.

The radiation device or transmitter is to provide electromagnetic radiation in the near infrared, and may comprise, for example, a heated filament or a halogen radiator. Preferably, a radiation intensity emitted by the radiation device is controllable or adjustable.

In addition, it would also be conceivable for a laser to be used as the radiation source, in particular a laser with a comparatively broadband radiation characteristic. For example, a tunable laser could be used, such as a laser that has a so-called OPO (optical parametric oscillator).

Optionally or alternatively, it is possible that the intensity of the radiation device is controlled based on a reference value without a sample or a separately measured physical parameter of the radiation device (e.g. its temperature).

Preferably, the radiation device comprises a reflector device which directs or additionally directs the radiation to the plastic preforms and/or to the receiving device. Optionally or alternatively, optical components such as lenses, apertures or mirrors may be provided in the beam path between the radiation device and the receiving device to guide and/or enhance the signal. In a further preferred embodiment, shielding means are provided to shield the beam path between the radiation device and the receiving device from reflections and direct radiation from radiation sources other than the radiation device.

Preferably, a corresponding apparatus is designed such that the plastic preforms pass through the beam path perpendicularly thereto and preferably always with the same section of the preform body. Preferably, the apparatus can be mounted in the preform feed of a stretch blow molding machine, but also on plastic preform transfer devices with fixed pitch (for example, in a heating device) or other handling device of the preforms. In the context of the present application, the terms plastic preform and preform are used interchangeably.

It is possible that the radiation emitted by the radiation device is more broadband, but only certain ranges are evaluated on the receiving side. However, it would also be possible that the emitted radiation is already filtered before it hits the plastic preforms (in particular depending on the wavelength), so that only certain radiation components reach the plastic preforms.

Thus, it is possible that an infrared transmission or absorption measurement is carried out in a range of 1500 to 2000 nm and an evaluation is carried out within this range at one or more target wavelengths, so that one or more measured values are obtained, in particular after signal processing. It may be useful to include a spectral range surrounding a specific target wavelength in the evaluation.

Preferably, the absorption measurements are carried out as transmission measurements or absorption measurements through a region of the plastic preform, in particular a plastic preform body. In this context, it is possible that one and or more arranged radiation devices or transmitters are provided and/or also one or more—in particular parallel arranged—(radiation) receiving devices.

In addition, it is also possible that one or more radiating devices arranged in parallel and one or more optical devices are provided, which split the signal to two or more receiving devices, such as mirrors, as described in more detail below. It should be noted that in the context of the present applications, the terms receiver and receiving device are used interchangeably.

Preferably, the receiving device or several receiving devices detect at least one of the particular target wavelength.

In a preferred embodiment, the plastic preforms have a mouth region, a base body adjoining this mouth region in a longitudinal direction of the plastic preforms, and a bottom dome region adjoining the base body in the longitudinal direction. The plastic preforms are preferably exposed to the infrared radiation in a region of the base body. The base body is particularly suitable for the absorption measurements, since on the one hand it is generally straight or cylindrical and no additional, disturbing reflections occur, for example, at threaded sections or at a support ring.

In a further preferred embodiment, the absorption is determined in a first wavelength range, wherein said first wavelength range is between 1500 nm and 1600 nm.

An infrared transmittance or absorption measurement is favorable in a range of 1500 to 2000 nm and, as mentioned above, is made within this range in one or more target wavelengths.

One of these target wavelengths can, for example, be around 1550 nm, i.e. a range with relatively high transmission. In this wavelength range, different absorption behaviors of the PET plastic preforms can be well distinguished. Preferably, a characteristic value characterizing the heating of the preforms by means of infrared radiation can be formed therefrom. Preferably, this wavelength range is between 1500 nm and 1600 nm, preferably between 1510 nm and 1590 nm, preferably between 1520 nm and 1580 nm, preferably between 1530 nm and 1570 nm.

At the same time, a measured value at this point can also be calculated together with other measured values to form further measured or characteristic values, preferably to quantitatively determine the water content. This is explained further below in the figures. Here, different absorption behaviors of the PET plastic preforms can be well distinguished.

Particularly preferably, the plastic preforms are made of PET.

In a further preferred method, the absorption is determined in a wavelength range, wherein this wavelength range is between 1850 nm and 1960 nm. Preferably, this wavelength range is between 1860 nm and 1950 nm, preferably between 1870 nm and 1940 nm, preferably between 1880 nm and 1930 nm. Particularly preferably, this range is around a target wavelength of 1915 nanometers.

Thus, the second target wavelength is a wavelength of 1915 nm. This is a range of the strongest water absorption band in the near infrared. From this, a measured value can ultimately be derived, which is used as a measured value for the water absorption within the plastic preform or—in particular with another measured value—can be calculated to a quantitative water content.

In a preferred method, at least one value is output which is characteristic of a water content of the plastic preforms. In particular, this can be an absorption value of the plastic preforms at a predetermined wavelength or in a predetermined wavelength range, in particular in the wavelength ranges specified above around 1550 nm and 1915 nm.

Preferably, measurements are made in at least these two wavelength ranges.

In a preferred method, the radiation device emits radiation which does not heat the plastic preforms and/or which is less in intensity than 20% of that radiation used to heat the plastic preforms.

In a further preferred method, the radiation passing through the plastic preform is recorded by means of at least two receiving devices. This makes it possible in particular to assess the plastic preform in the wavelength ranges mentioned.

In a further preferred method, the two receiving devices are suitable and intended for receiving and/or evaluating radiations of different wavelength ranges. Thus, as mentioned above, each receiving device can detect one of the target wavelength ranges. This can be done, for example, by using optical bandpass filters and in this case in a technically useful manner including a detected wavelength range of preferably up to 100 nm, optionally up to 200 nm, centered on the above mentioned target wavelengths and in particular also related to a transmission level of 50%.

Preferably, the measurement is carried out as a transmission measurement or absorption measurement through the preform body, which can be carried out by means of either one or more radiation devices (in particular arranged in parallel) and/or one or more receiving devices (in particular arranged in parallel) or one or more radiation devices arranged in parallel and one or more optical devices which distribute the signal or radiation to two or more receiving devices.

In a further preferred method, the radiation is emitted by at least two radiation devices. These two radiation devices may be arranged one above the other in the longitudinal direction of the plastic preforms (or next to each other perpendicular to the longitudinal direction).

In a further preferred embodiment, the radiation device(s) are also controlled taking into account the transport movement of the plastic preforms. Thus, it is possible that radiation is only emitted when a plastic preform is currently passing the radiation device. However, it would also be possible for the radiation device to emit radiation permanently. It is also possible for the receiving devices to be controlled taking into account the transport movement of the plastic preforms and, for example, to be active only when a plastic preform is currently passing the radiation path between the radiation device and the receiving device.

Furthermore, it is also possible that for the purpose of the measurement a position of the plastic preforms along their transport path is determined, for example by means of light barriers. For example, the absorption measurement may be triggered or initiated by a light barrier.

In a further preferred method, as mentioned above, the radiation emitted by the radiation device and reaching the receiving device is filtered by means of at least one filter device.

These can be, for example, so-called band-pass filters which filter the radiation, in particular with regard to its wavelength. For example, it is possible that said filters only allow radiation to pass in a narrow wavelength range, for example in a wavelength range that is distributed in a Gaussian shape around a central wavelength such as 1560 nanometers or 1915 nanometers.

In a further preferred method, it is possible to detect the signal from the radiation device or the radiation without a sample (or without a plastic preform) in the beam path in order to obtain a reference value which can be calculated in a sample measurement.

In a further advantageous embodiment, a prevention device may be provided which at least temporarily prevents (new) plastic preforms from entering the beam path and/or blocks such entry.

For example, an auxiliary device can be used which, at least for a short time, prevents the entry of new preforms into the beam path and thus preferably enables the necessary detection of the radiation without a sample (or without a plastic preform).

It would also be possible for an entry of new preforms into the beam path to be interrupted at least briefly by (selective) control of the existing preform conveying equipment and/or preform handling equipment.

In a further preferred method, the signal from the receiving device is acquired or stored when the receiver is covered, in particular in order to calculate it during the sample measurement.

In a further preferred method, further physical parameters are taken into account, such as in particular geometric data of the plastic preform. This data can, for example, be recorded or stored and preferably included in calculations.

The signals of the receiving device are preferably processed in a suitable manner with, in particular, adjustable amplification. These processed signals of the receiving device are preferably evaluated according to their temporal course or at discrete points in time, for example with a trigger signal, to form a measured value.

Preferably, the time course of the receiver signal is analyzed in such a way that a local Maximum is searched for and/or evaluated as a measured value The measured values of the device (i.e. in particular the absorption values and reference values) are preferably calculated to at least one characteristic value of the infrared absorption. This can preferably be a characteristic value selected from a group of characteristic values comprising a characteristic value for the heating of the plastic preforms, a characteristic value for the water absorption, a quantitative water content measurement value, and optionally further characteristic or measurement values based on the measurement values.

Preferably, these determined values are used for—in particular continuous—quality monitoring on up to 100% of the plastic preforms, in particular for generating messages and/or warnings and also for precautionary shutdown of the plant producing or processing the plastic preforms (for example, when adjustable threshold values or adjustable relative changes in the temporal course of the determined values are reached). In addition, the determined values can also be used for controlling the plant producing or processing the plastic preforms or its components.

In a preferred embodiment, the plastic preforms are heated by means of a heating device for heating plastic preforms and are then formed into plastic containers by a forming device for forming plastic preforms, wherein the heating device preferably being controlled and/or the forming device being controlled taking into account the evaluation of the radiation (passing through the plastic preforms from the radiation device and reaching the receiving device), that is to say in particular taking into account the results evaluated by the receiving devices.

Preferably, the heating device is an infrared heating device. This can have a transport device which transports the plastic preforms past heating devices, wherein these heating devices are preferably arranged stationary. Furthermore, the plastic preforms can be rotated with respect to their longitudinal axis during transport. However, it is also conceivable that the infrared heating device has a plurality of movable cavities within which the plastic preforms are transported and heated.

The forming device may preferably be a blow molding machine, and in particular a stretch blow molding machine, which expands the plastic preforms by acting upon a flowable medium within individual cavities. This flowable medium may in particular be blowing air, but it would also be conceivable for the plastic preforms to be expanded by being acted upon by a liquid, in particular a beverage to be filled.

Preferably, parameters of the heating device and/or parameters of the forming device are adjusted taking into account the absorption behavior of the plastic preforms. In the case of the heating device, for example, a heating temperature can be adapted, a rotational speed of the rotational movement of the plastic preforms with respect to their longitudinal axis, or in particular also a heating power of the individual heating devices, which can in particular also be carried out as a function of different regions of the plastic preforms in the longitudinal direction. For example, it would be possible that in response to a certain absorption behavior of the plastic preforms, the lower regions of the base bodies are heated more strongly than regions lying higher (with respect to the longitudinal direction).

Parameters of the forming operations by means of the forming device can also be adjusted. In this regard, all cavities of the forming device together or any individual cavities of the forming device with parameters differing from each other can be influenced. For example, a blowing pressure can be modified in reaction to and/or taking into account the absorption behavior of the plastic preforms, the movement of a stretching bar that stretches the plastic preforms in their longitudinal direction, or even the time sequence of different pressure levels applied to the plastic preforms.

Particularly preferably, the absorption of the plastic preforms is measured before they are heated, that is, in particular, before the plastic preforms enter or run into a heating device for heating the plastic preforms.

However, it would also be conceivable that the heating device is a microwave heating device, wherein the plastic preforms are transported into cavities and heated there with microwave radiation. The heating of this microwave heating device can also be adapted and/or controlled taking into account the absorption behaviour of the plastic preforms.

The present invention is further directed to an apparatus for analyzing plastic preforms, comprising a transport device which transports the plastic preforms along a predetermined transport path and an absorption coefficient determining device which determines an infrared absorption coefficient in at least one region of the plastic preform, wherein the absorption coefficient determining device having a radiation device which, in order to determine the infrared absorption coefficient, applies infrared radiation to the plastic preforms, and a receiving device being provided which receives radiation passing through the plastic preforms, and wherein it being possible to determine an infrared absorption behaviour of the plastic preform from this received radiation.

According to the invention, the radiation device applies infrared radiation in a predetermined wavelength range to the plastic preforms and an evaluation device is provided which evaluates the radiation as a function of its wavelength in a wavelength range from 1500 nm to 2000 nm.

It is therefore also proposed on the apparatus side that the apparatus is set up in such a way that in particular radiation and/or the absorption behavior is evaluated in a wavelength range from 1500 nm to 2000 nm. Preferably, at least one sub-range and preferably at least two sub-ranges are evaluated within this wavelength range, such as in particular a wavelength range around a wavelength of 1550 nm and around a wavelength of 1915 nm.

In a preferred embodiment, the apparatus comprises a second receiving device and preferably the two receiving devices are suitable and intended for receiving and/or evaluating radiation in different wavelength ranges.

In a preferred embodiment, the device comprises an optical filter device which is suitable and intended to allow radiation to pass only in a predetermined wavelength range. Preferably, these are so-called band-pass filters, as mentioned above.

Preferably, this filter device is arranged in a beam path between the radiation device and the receiving device. The filter device can be arranged both upstream and downstream of the plastic preforms.

In a further preferred embodiment, the receiving device can be covered. In this way, a "background noise" of the receiving device can be determined and taken into account in the evaluation of the transmittance.

In a preferred embodiment, the apparatus comprises a heating device and/or a forming device. Thereby, it is possible that this heating device and/or the forming device comprise control devices which control the heating device and/or the forming device also on the basis of the absorption behaviour of the plastic preform.

Furthermore, it is possible that for each plastic preform the absorption behavior is determined over a predetermined period of time. In this way, the absorption behavior of the plastic preform can also be determined over its circumferential direction.

Furthermore, an evaluation of the absorption behavior preferably takes place only after a plastic preform has completely passed through the beam path. In a preferred method, it would also be conceivable that measurements are carried out at several points along the transport path of the plastic preforms, wherein the plastic preforms can also have different orientations during the different measurements.

For example, it would be conceivable for the plastic preform to rotate so quickly (in particular with respect to its longitudinal axis) that approximately 180° of the circumference of the plastic preform can be imaged in the beam path within a narrow window of time. In this case, the sensor system and signal processing would resolve any differences in time periods of less than 20 ms, preferably less than 10 ms.

Thus, it is possible that the plastic preform rotates with respect to its longitudinal direction during the determination of the absorption behaviour. However, it would also be possible that the plastic preform is not rotated during the measurement of the absorption behaviour.

Preferably, the invention is intended to find application in the processing and production of plastic preforms in which the preferably recorded characteristic values for heating by means of infrared radiation (or also microwave radiation) and for water absorption play a particular role. In the processing of plastic preforms with a proportion of recycled material obtained from reprocessed bottles, plastic preforms or other products, the absorption characteristics of the infrared radiation may change, in particular when production batches are changed.

This causes changes in the temperature profile of the plastic preforms when heated by infrared radiation (or microwaves). The consequence can be shifts in the material distribution of manufactured containers. In order to increase the production of rejects, this should be done by measuring the characteristic value for heating by means of infrared radiation.

Preferably, in particular when faults or deviations (from a desired state) occur, production can be stopped. Additionally or optionally, the changes are to be counteracted in a suitable manner by control interventions on the heating device of the plastic preforms.

When processing plastic preforms into containers with carbonated filling material, the stability of the container against the existing internal pressure is important. The material distribution in the container is decisive for this, as it determines the local stability of the container. Furthermore, an increased moisture content in the plastic preform can reduce the achieved orientation in the container wall and influence the stability. As a result, undesirable, excessive deformation of the container may cause problems.

In order to avoid the production of rejects, this should be detected by measuring the characteristic values for heating by means of infrared radiation and water absorption and, if necessary, production should be stopped. Optionally, the changes are to be counteracted in a suitable manner by control interventions on the heating device of the plastic preforms.

When plastic preforms are formed into containers for hot filling, the dimensional stability of the container on contact with the hot product is important. Decisive for this are, in particular, low residual stresses in the bottle wall, which are achieved, among other things, by high preform temperatures, as well as the glass transition point of the material, which is to be specifically increased by the process control (heatset process with temperature-controlled mold wall).

Increased moisture content in the plastic preform can accelerate the rate of crystallization of the PET and can cause the plastic preform to crystallize at the high preform temperatures required before it is formed into a container.

Furthermore, as the water content in the plastic preform increases, the glass transition temperature of the material decreases and the bottle loses stability at the contact with the hot product. In order to avoid the production of rejects and problems with the production and filling of the bottles, this is to be detected by measuring the characteristic values for heating by means of infrared radiation and water absorption and production can be stopped if necessary. Optionally or alternatively, the changes can also be counteracted in a suitable manner by control interventions on the heating device of the plastic preforms.

In the manufacture of particularly lightweight containers, the material distribution is of particular importance. If the plastic preforms have a changing absorption characteristic of the infrared radiation, this causes changes in the temperature profile of the plastic preform when heated by infrared radiation. This can result in shifts in the material distribution of the manufactured containers and impair their function or lead to other defects, e.g. local excessive stretching of the material which becomes visible as so-called white fracture.

Furthermore, for particularly lightweight containers, a higher preform temperature is necessary due to the necessarily higher stretching of the material. An increased water content can increase the crystallization rate of the material in the preform so that it could crystallize before it is formed into a bottle. Furthermore, the achieved strength of the reduced amount of material is important. Increased water content can reduce the achieved orientation of the material and thus the stability of the bottle.

In order to avoid the production of rejects, this should be detected by measuring the characteristic values for heating by means of infrared radiation and water absorption and, if necessary, production should be stopped. Optionally or alternatively, the changes are to be counteracted in a suitable manner by control interventions on the heating device of the plastic preform.

In the production of containers, where the plastic preform is sterilized, for example with hydrogen peroxide or electron radiation, before being formed into a container, it is necessary to transport the plastic preforms in a heated state for a longer period of time after heating until they are formed into a container.

This can lead to premature crystallization of the plastic preform, which interferes with the forming into the container or causes quality defects. The water content of the plastic preform increases the crystallization rate of the preform material.

In order to avoid the production of rejects, this should be detected by measuring the characteristic values for heating by means of infrared radiation and water absorption and, if necessary, production should be stopped. Optionally or alternatively, the changes are to be counteracted in a suitable manner by control interventions on the heating device of the plastic preforms.

BRIEF DESCRIPTION OF THE DRAWINGS

Further advantages and embodiments will be apparent from the accompanying drawings: In the drawings.

DETAILED DESCRIPTION OF THE INVENTION

Figure 1:
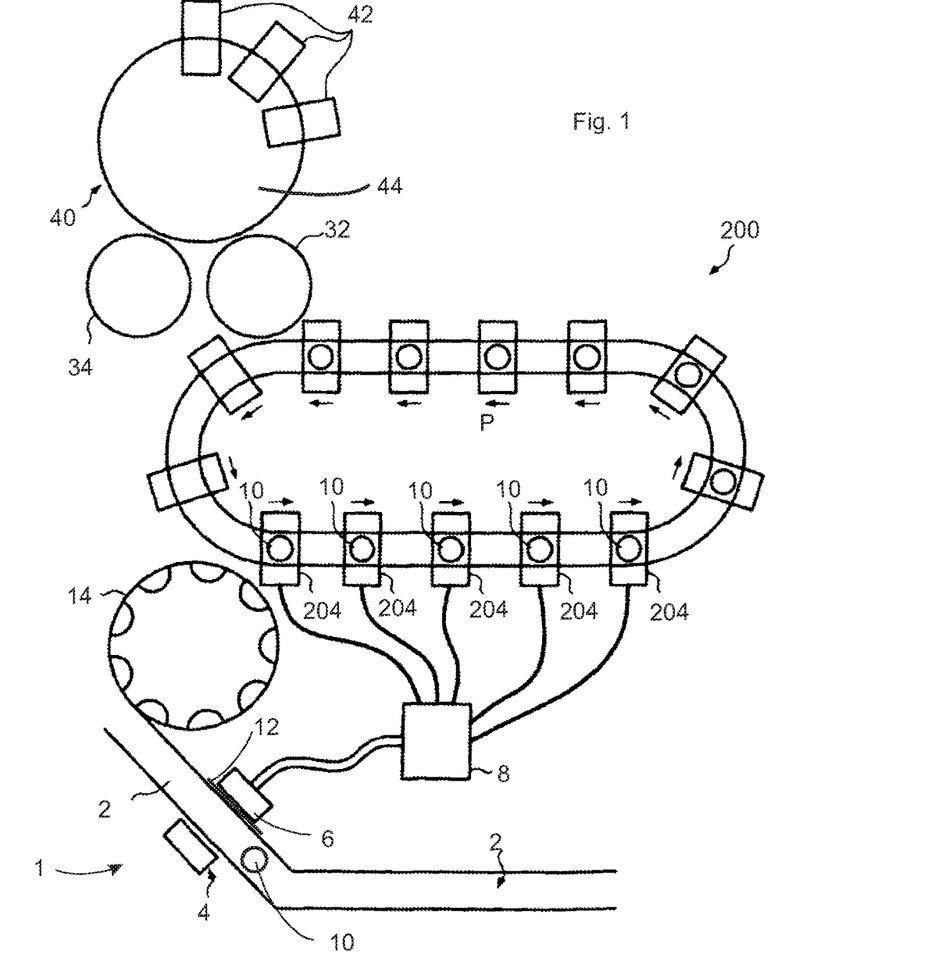
FIG. 1 shows a schematic representation of an apparatus according to the invention for producing containers.

FIG. 1 shows a schematic representation of an apparatus 1 according to the invention for treating containers. In this case, a feed device such as a feed rail 2 is provided, which transports plastic preforms 10 in the direction of a single-cycle starwheel 14. In the embodiment shown in FIG. 1, this feed device is thus the transport device which transports the plastic preforms.

In the area of this feeding device, the apparatus for checking the absorption, designated in its entirety as 1, is provided. This has at least one radiation device 4 and a receiving device 6. The radiation device 4 transilluminates the plastic preforms 10 and the transmitted radiation is received by the receiving device 6. The reference sign 12 refers to an optionally present filter device, which is arranged in the beam path between the radiation device 4 and the receiving device 6. This may be a bandpass filter, as mentioned above.

The reference sign 8 indicates an evaluation device which evaluates the received radiation with reference to the absorption coefficient. The results of this evaluation device are transmitted to the individual heating units 204 of a heating device 200 as shown in FIG. 1. Preferably, a value can be determined, transferred and/or taken into account which is characteristic for a water content of the plastic preforms.

This heating device 200 comprises a transport device 202 which transports the containers or plastic preforms during the heating process with said heating units 204. These heating units are shown in FIG. 1 as movable heating units. These heating units 204 can be, for example, microwave heating devices which individually heat the individual plastic preforms.

Preferably, however, the heating units 204 may instead be arranged in a stationary manner and in particular in the form of infrared heating devices past at which the plastic preforms are passed by.

The heated plastic preforms are transferred to a forming device 40 via a transfer starwheel 32. This forming device 40 here also has a rotatable carrier 44 on which a plurality of forming stations 42 are arranged. Preferably, the forming stations 42 are also controlled with the aid of data from the evaluation device 8. A further transfer starwheel 34 conveys the formed containers back out of the system.

In a preferred embodiment, the apparatus comprises an assignment device which assigns a particular plastic preform analyzed by the apparatus 1 to a forming station 42 which will later form it.

Figure 2:
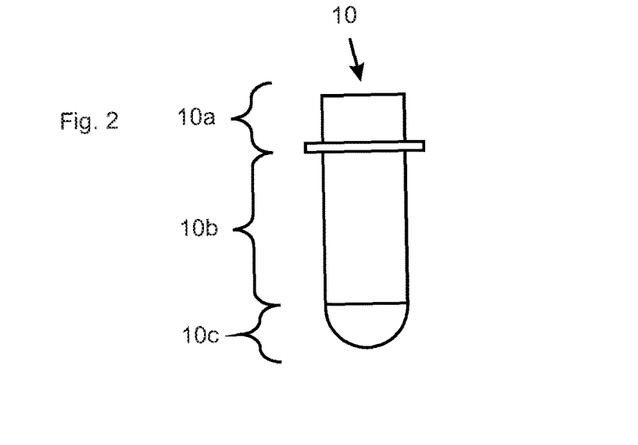
FIG. 2 shows a representation of a plastic preform.

FIG. 2 shows an illustration of a plastic preform 10, which has a mouth portion 10a, a base body 10b and also a bottom dome portion 10c with the dome of the plastic preform. As mentioned above, in particular the base body 10b is applied with the infrared radiation from the radiation device 4.

Figure 3:
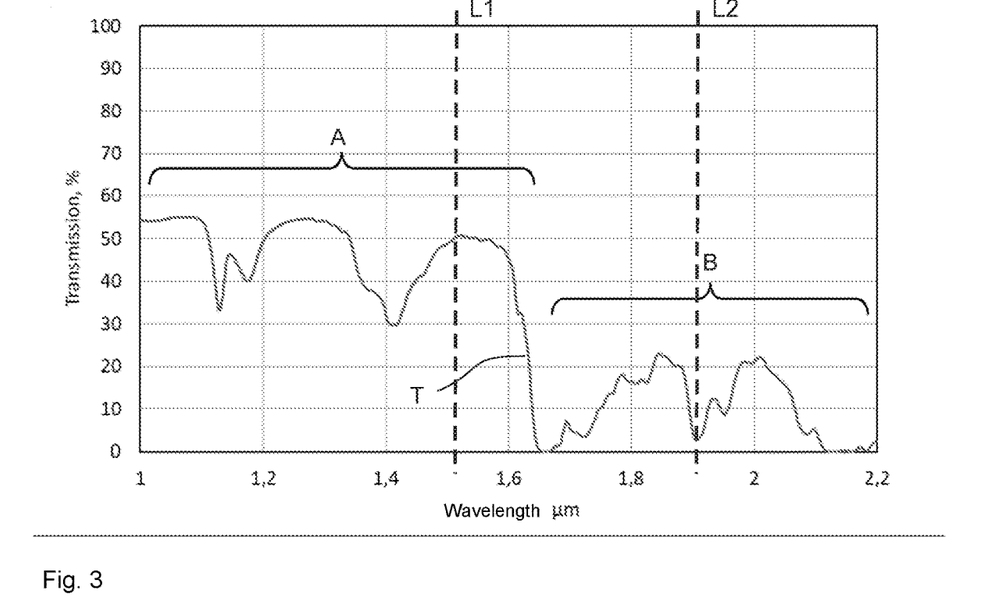
FIG. 3 shows a representation of a transmission or absorption spectrum.

FIG. 3 shows a representation of the transmission spectrum of the plastic preforms. A region A and a region B can be seen here. In region A there is a comparatively high transmission and thus, conversely, a comparatively low absorption. In the wavelength range B, there is a low transmission and thus correspondingly a high absorption of the plastic preform. The two vertical lines L1 and L2 indicate the above-mentioned wavelengths of 1550 nm and 1915 nm.

As mentioned above, the wavelength range of approx. 1550 nm is of particular importance, as the absorption is relatively low in this range. A further interesting range is the range between 1.8 and 2 µm, since here there are also strong changes in absorption.

Figure 4:
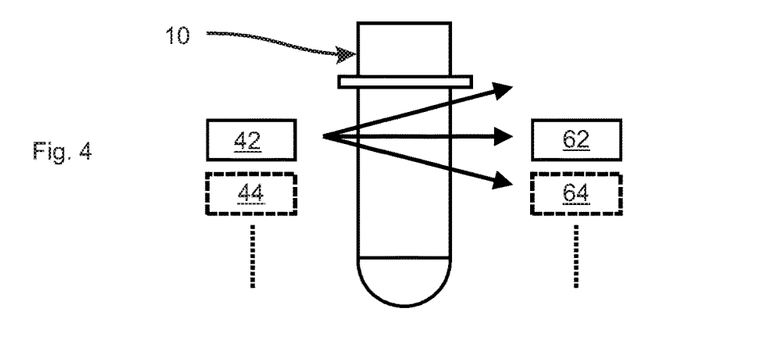
FIG. 4 shows an illustration illustrating the invention in a first embodiment.

FIG. 4 shows a schematic diagram illustrating the radiation of the plastic preforms. It can be seen that the plastic preform is radiated here by a plurality of radiation devices 42, 44 . . . and at least one and preferably several receiver devices 62, 64 are arranged on the receiver side. These can be arranged next to one another or one below the other. In the embodiment shown in FIG. 4, both the radiation devices and the receiving devices can be arranged one above the other in the longitudinal direction of the plastic preform.

As mentioned above, each receiving device shall be able to detect one of the target wavelengths. As mentioned, this is preferably done by using optical bandpass filters and in this case in a technically reasonable manner in a wavelength range of preferably up to 100 nm optionally up to 200 nm centered on the target wavelength and preferably related to a transmission level of 50% of the maximum transmission of a passband filter.

Figure 5:
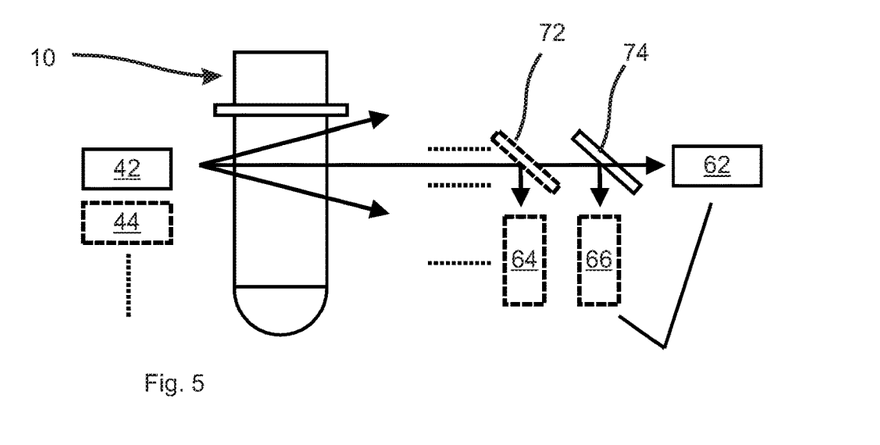
FIG. 5 shows a representation of the invention in a second embodiment.

FIG. 5 shows a representation in which only one beam direction is detected here perpendicular to a longitudinal direction of the plastic preform. In this embodiment, several receiving devices 62, 64, 66 are also provided, wherein mirrors 72, 74 are provided here which redirect certain radiation components to the different receiving devices. This may involve mirrors 72, 74 reflecting certain wavelengths and allowing other wavelengths to pass. In this way, too, a wavelength-specified recording or detection of the radiation can take place.

Figures 6, 7:
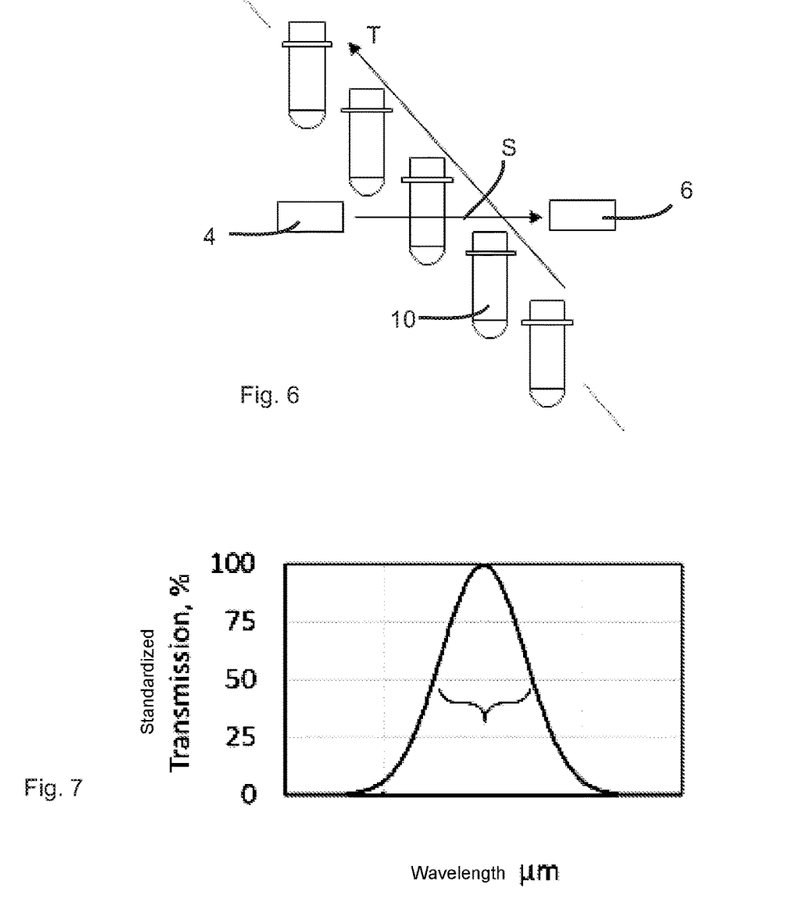
FIG. 6 shows a further illustration of the apparatus according to the invention.
FIG. 7 shows a representation of a normalized transmission.

FIG. 6 shows a further schematic representation illustrating the invention. It can be seen that here the plastic preforms 10 are transported along the transport path T and are transilluminated by the radiation device 4 (beam path S) during transport. This apparatus is preferably arranged here in such a way that the plastic preforms pass through the beam path S perpendicularly thereto and preferably always with the same section of the preform body.

FIG. 7 shows a representation for recording a profile in a predetermined range. The maximum of the curve indicates the target wavelength, which then decreases here, for example, in a Gaussian or Lorentz-shaped manner, wherein transmission is taken into account in a corresponding range around this target wavelength. The target wavelength can be the maximum of the spectral curve.

Figure 8:
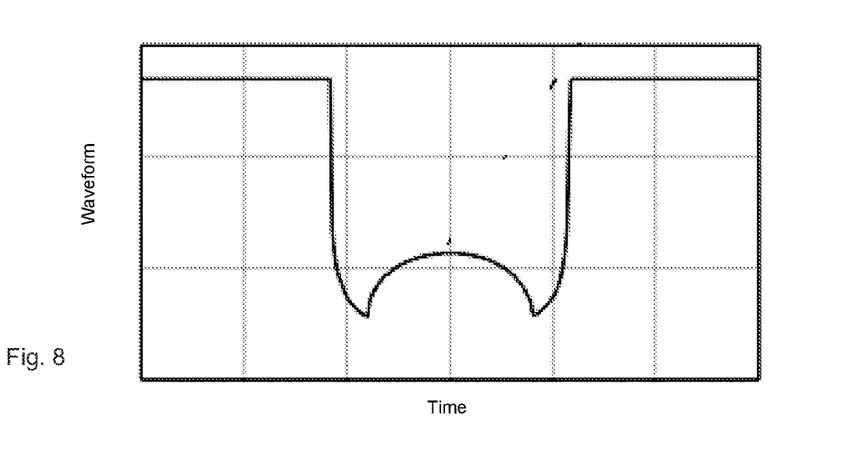
FIG. 8 shows an illustration of a transmission curve over time.

FIG. 8 shows a time course of a signal, which also results from the movement or transport of the plastic preforms.

The applicant reserves the right to claim all features disclosed in the application documents as essential to the invention, provided that they are individually or in combination new compared to the prior art. It is further pointed out that the individual figures also describe features which may be advantageous in themselves. The skilled person immediately recognizes that a particular feature described in a figure can be advantageous even without adopting further features from that figure. Furthermore, the skilled person recognizes that advantages can also result from a combination of several features shown in individual figures or in different figures.

The invention claimed is:

1. A method for analysing plastic preforms, wherein plastic preforms are transported along a predetermined transport path by a transport device and an infrared absorption coefficient is determined in at least one region of at least one plastic preform, wherein, in order to determine the infrared absorption coefficient, the plastic preform is acted upon with infrared radiation by a first radiation device and radiation passing through the plastic preform is received by at least one receiving device and an infrared absorption behaviour of the plastic preform is determined from this received radiation,
wherein
the radiation device applies infrared radiation in a predetermined wavelength range to the plastic preform and an evaluation device evaluates the radiation dependent of its wavelength in a wavelength range from 1500 nm to 2000 nm, wherein signals of the receiving device are processed with adjustable amplification, wherein the processed signals of the receiving device are evaluated according to their temporal course or at discrete points in time to form a measured value.

2. The method according to claim 1,
wherein
the plastic preforms have a mouth region, a base body adjoining this mouth region in a longitudinal direction of the plastic preforms, and a bottom dome region adjoining the base body in the longitudinal direction, and the plastic preforms are acted upon with the infrared radiation in the region of the base body.

3. The method according to claim 2, wherein
at least one value characteristic of a water content of the plastic preforms is output.

4. The method according to claim 2, wherein
the absorption is determined in a first wavelength range, wherein said first wavelength range being between 1500 nm and 1600 nm.

5. The method according to claim 2, wherein
the absorption is determined in a second wavelength range, wherein said second wavelength range being between 1850 nm and 1960 nm.

6. The method according to claim 2, wherein
the radiation passing through the plastic preforms is received by at least two receiving devices.

7. The method according to claim 6, wherein
the two receiving devices are configured for receiving and/or evaluating radiation in different wavelength ranges.

8. The method according to claim 7, wherein
the radiation is output from at least two radiation devices.

9. The method according to claim 1, wherein
at least one value characteristic of a water content of the plastic preforms is output.

10. The method according to claim 1, wherein
the absorption is determined in a first wavelength range, wherein said first wavelength range being between 1500 nm and 1600 nm.

11. The method according to claim 1, wherein
the absorption is determined in a second wavelength range, wherein said second wavelength range being between 1850 nm and 1960 nm.

12. The method according to claim 1, wherein
the radiation passing through the plastic preforms is received by at least two receiving devices.

13. The method according to claim 12, wherein
the two receiving devices are configured for receiving and/or evaluating radiation in different wavelength ranges.

14. The method according to claim 13, wherein
the radiation is output from at least two radiation devices.

15. The method according to claim 14, wherein
the radiation emitted by the radiation device and reaching the receiving device is filtered by at least one filter device.

16. The method according to claim 1, wherein
the plastic preforms are heated by a heating device for heating plastic preforms and are subsequently formed into plastic containers by a forming device for forming plastic preforms, wherein a control of the heating device and/or a control of the forming device takes place taking into account the evaluation of the radiation.

17. An apparatus for analysing plastic preforms, having a transport device which transports the plastic preforms along a predetermined transport path, and having an absorption coefficient determining device configured to determine an infrared absorption coefficient in at least one region of the plastic preform, wherein the absorption coefficient determining device has a radiation device which, in order to determine the infrared absorption coefficient, is configured to apply infrared radiation to the plastic preforms, and a receiving device is provided which is configured to receive radiation passing through the plastic preforms and from this received radiation an infrared absorption behaviour of the plastic preform can be determined,
wherein
the radiation device is configured to act upon the plastic preforms to infrared radiation in a predetermined wavelength range and an evaluation device is provided which is configured to evaluate the radiation dependent of its wavelength in a wavelength range from 1500 nm to 2000 nm, wherein signals of the receiving device are processed with adjustable amplification, wherein the processed signals of the receiving device are evaluated according to their temporal course or at discrete points in time to form a measured value.

18. The apparatus according to claim 17, wherein
the apparatus has a second receiving device and preferably the two receiving devices are configured for receiving and/or evaluating radiation in different wavelength ranges.

19. The apparatus according to claim 17, wherein
the apparatus comprises a filter device which is configured to allow only radiation in a predetermined wavelength range to pass.

20. The apparatus according to claim 18, wherein
the apparatus comprises a filter device which is configured to allow only radiation in a predetermined wavelength range to pass.

* * * * *